United States Patent [19]
Ryba

[11] Patent Number: 4,503,743
[45] Date of Patent: Mar. 12, 1985

[54] BAND SAW WITH TILT AND SLIDE FRAME AND QUICK RELEASE VISE

[76] Inventor: Chester Ryba, 3152 50th St., Bangor, Mich. 49013

[21] Appl. No.: 466,056

[22] Filed: Apr. 4, 1983

[51] Int. Cl.³ .............................................. B27B 13/04
[52] U.S. Cl. ......................................... 83/801; 83/811
[58] Field of Search ................. 83/812, 811, 810, 809, 83/801, 797–800, 581

[56] References Cited

U.S. PATENT DOCUMENTS

| | | | |
|---|---|---|---|
| 4,111,085 | 9/1978 | Johnson | 83/811 X |
| 4,170,912 | 10/1979 | Bliss | 83/801 X |

*Primary Examiner*—James M. Meister
*Attorney, Agent, or Firm*—Austin A. Webb

[57] ABSTRACT

A band saw and its supporting and drive pulleys and motor is mounted on a saw support frame having spaced end members. The end members have slideways co-acting with slides on spaced support arms pivoted to opposite ends of a work support. Locks selectively fix the arms in adjusted positions. An hydraulic cylinder is connected to raise and lower the support frame end members relative to the work support. Racks on the support arms co-act with connected pinions on the saw support frame to hold the saw frame aligned with the arms.

An adjusting screw on the underside of the bed is releasably engaged by blocks on the underside of the clamp jaw having opposed tooth sectors. The blocks are biased to tooth engaging position, and a cam on the clamp jaw spreads the blocks for quick slide adjustment.

14 Claims, 6 Drawing Figures

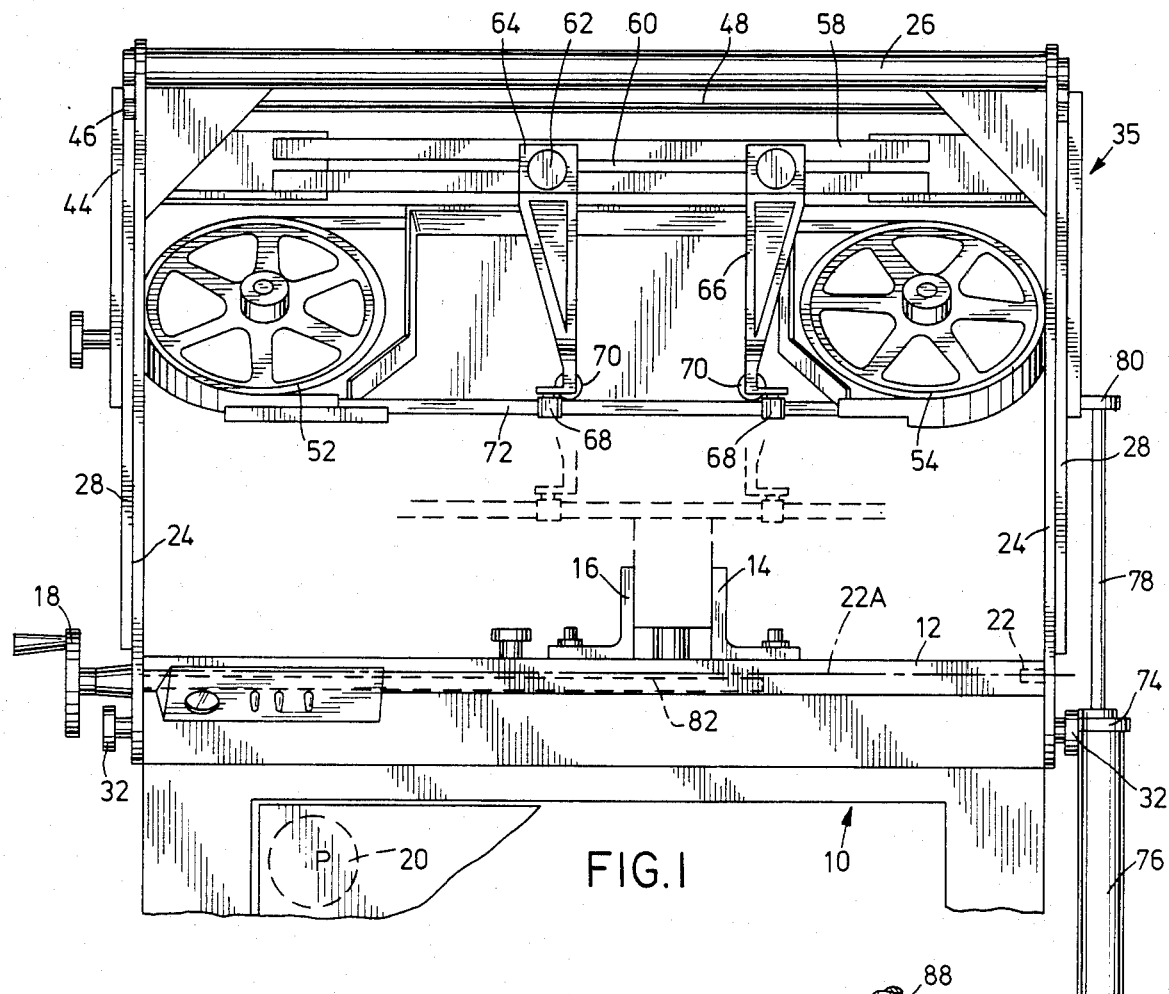
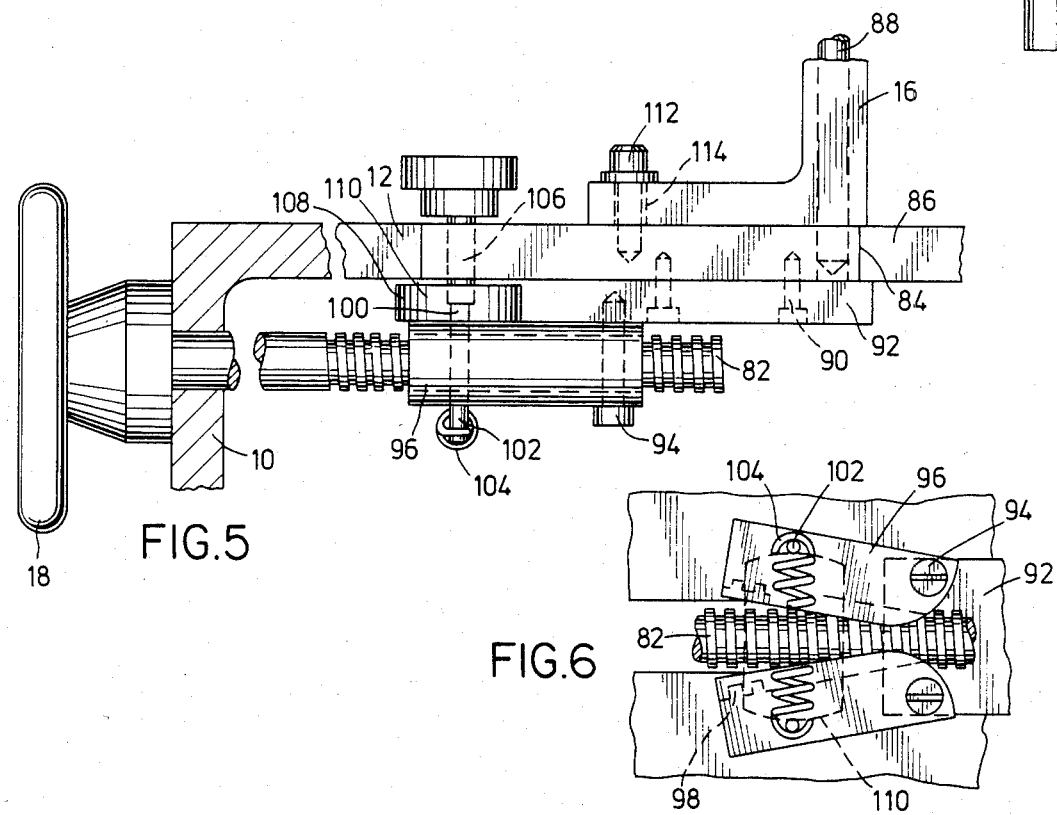

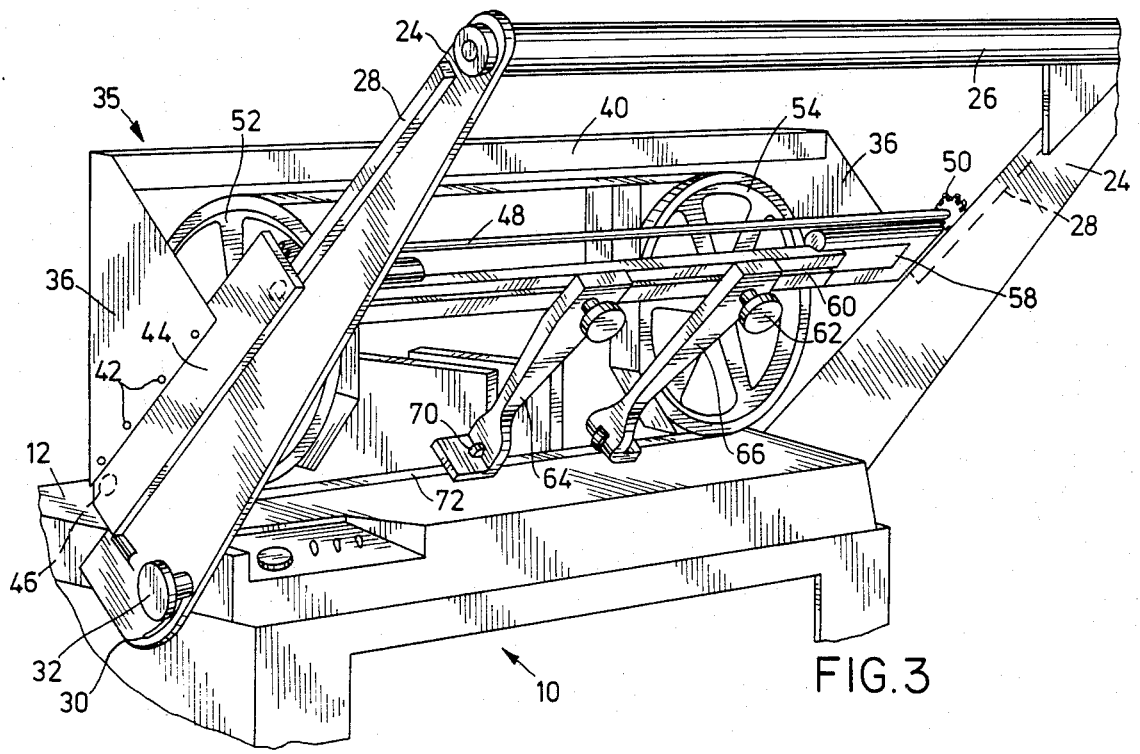
FIG. 3
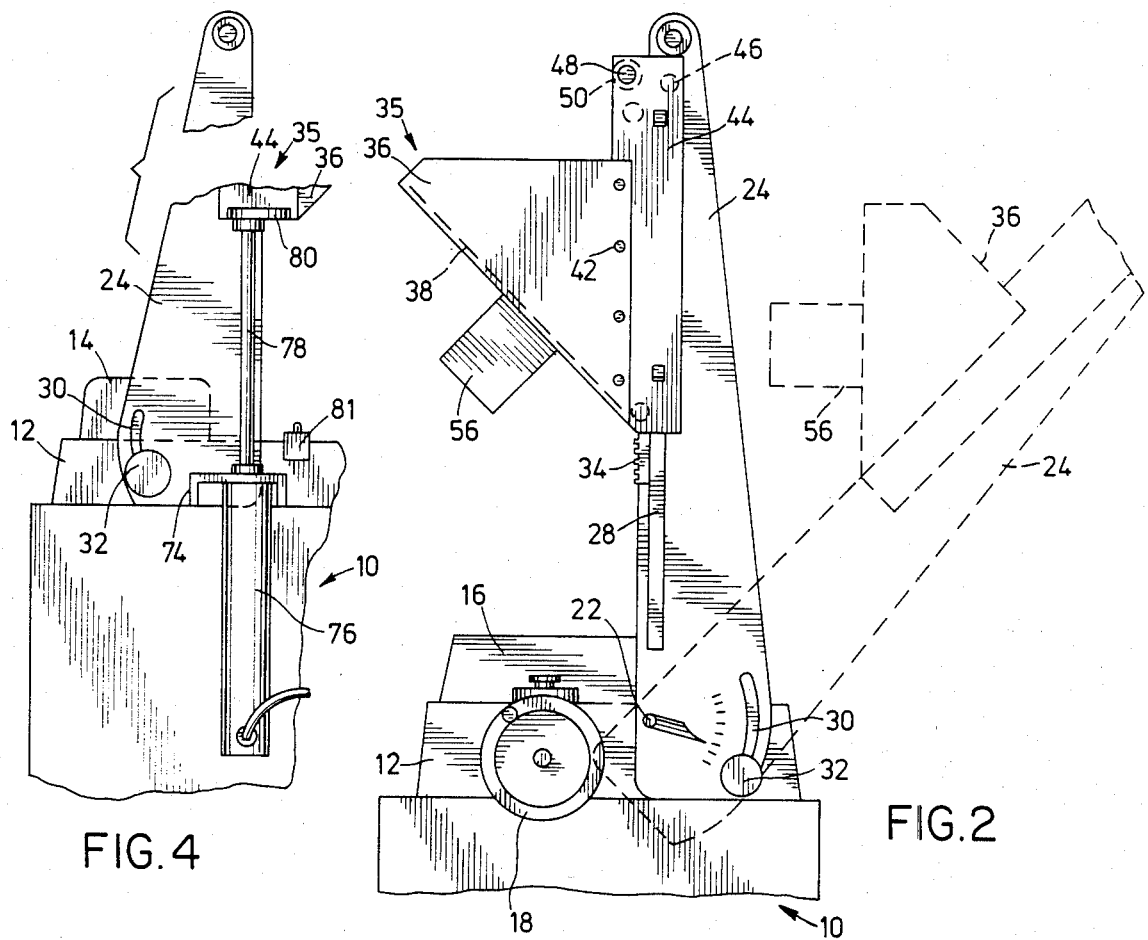
FIG. 4
FIG. 2

4,503,743

BAND SAW WITH TILT AND SLIDE FRAME AND QUICK RELEASE VISE

OUTLINE OF INVENTION

A work supporting base with work gripping jaws adjustable relative to each other and angularly relative to the base is provided with a pair of parallel arms, one at each end, pivoted to the base on a common axis. Each arm has a slide and a toothed rack along one edge. A saw support frame has end members with slideways thereon that engage the slides; interconnected pinions, one on each end member, mesh with the racks. A band saw has drive and idler pulley wheels mounted on the saw support frame to support the loop of the band saw in a plane disposed at an angle of about 45 degrees relative to the plane of the slides.

An hydraulic motor is connected to the drive pulley and also supported by the saw support frame. Selectively adjustable sector locks engagable between the work support base and the support arms permit adjusting the lower working reach of the band saw to approach the plane of the work support at any angle between 45 degrees and 90 degrees as the saw support frame travels down the slides on the arms. This permits the saw to make right angle or bevel cuts across the ends of work clamped in the gripping jaws; or to cut V notches in the ends of the work.

An hydraulic cylinder pivoted to one end of the work supporting base has its piston rod connected to one of the saw frame end members to raise and lower the saw support frame along the slides and racks. An hydraulic pump and reservoir for actuating the saw motor and the cylinder is mounted with the lower part of the work support base. Hydraulic valves and electrical controls and limit switches are indicated but not claimed.

A co-acting part of the assembly is a quick release connection between the adjusting screw and the adjustable work clamping jaw. Spaced blocks with toothed sectors are pivoted on the underside of the jaw and spring biased into engagement with opposite sides of an adjusting screw mounted on the base. A cam on the underside of the jaw and adjustable from the top of the jaw spreads the blocks to release the jaw from the screw.

DETAILED DESCRIPTION

The drawings, of which there are two sheets, illustrate a preferred form of the invention.

FIG. 1 is a front elevational view of the saw machine with the saw raised.

FIG. 2 is a fragmentary end elevational view of the machine as shown in FIG. 1.

FIG. 3 is a fragmentary perspective view of the front of the machine with the saw frame both lowered and tilted down.

FIG. 4 is a fragmentary end elevational view of the opposite end of the machine showing the hydraulic cylinder for controlling the saw feed.

FIG. 5 is an enlarged fragmentary side elevational view of the quick release mechanism of the slidable work gripping jaw.

FIG. 6 is a fragmentary bottom view of the clamp screw release mechanism shown in FIG. 5 with the feed screw disconnected for quick slide adjustment of the jaw.

The base of the machine, generally indicated at 10, has a work supporting bed 12 with work clamping jaws 14 and 16 angularly adjustable thereon. Jaw 16 is also laterally adjustable by the handwheel control 18. The lower part of the base 10 houses a reservoir and hydraulic pump 20 for actuating parts of the machine to be described presently.

Pivotally supported on each end of bed 12 by pivot pins 22 along a common pivot axis 22A are two saw frame support arms 24. The arms are connected at their outer swing ends by a cross bar 26. Each arm carries a rib-like slide rail 28 along its outer and upper or rear edge. At their lower ends, the arms define arcuate slots 30 for passing the shanks of headed lock bolts 32. The upper-rear edges of the arms also carry a rail of rack teeth 34 along their outer swing edges. The arms 24 and connecting bar 26 form a vertically tiltably adjustable frame which in turn supports the saw, the saw wheels and drive motor.

The saw wheels or pulleys are carried by a saw frame indicated generally at 35. The frame includes two generally triangular end members 36 with plates 38 turned transversely inwardly toward each other along their rear or top edges. A top rear cross bar 40 connects and reinforces the upper edges of the plates 38. The lower front edges of the triangular end members are secured as by fasteners 42 to the upper rear edges of a pair slide plates 44. The slide plates carry guide rollers 46 which engage and roll along the slide rails 28. The plates also carry the ends of a pinion shaft 48 which carries and rotates with pinions 50. The pinions in turn travel along the rack teeth 34 of the rack rails.

The rear plates 38 of the saw frame carry the saw wheels or pulleys. Pulley 52 is the idler and pulley 54 is driven by an hydraulic motor 56. The opposed inner edges of the plates 38 straddle the work and the work gripping jaws 14 and 16 as the arms 24 and the saw frame 34 are tilted.

The upper or forward ends of the slide plates 44 are connected by a cross bar 58. The bar defines a horizontal slot 60 which passes the clamp screws 62 for adjustably clamping the upper ends of guide arms 64 and 66 to the saw frame. The lower ends of the guide arms carry the usual guide rollers 68 and thrust rollers 70 for guiding the working reach 72 of the band saw blade. Desirably the guide arms and rollers twist the working reach forwardly from the plane defined by the rims of the pulleys 52 and 54.

With reference to FIGS. 1 and 4, it will be noted that a bracket 74 is secured to the lower end of the right arm 24. The bracket anchors and supports the upper end of an hydraulic cylinder 76 from the arm so that it swings with the arm. The piston rod 78 of the cylinder projects upwardly and is connected to a block 80 attached to the lower end of the right hand slide plate 44. The cylinder is thus operative to raise or to advance the saw frame 35 downwardly along the arms 24 and slide bars 28 in any angularly adjusted position of the arms and the saw frame.

No attempt has been made to illustrate the hydraulic and electrical control system as it is within the skill of persons familiar with saw feeding. It is contemplated that limit switches such as 80, electrically controlled valves and variable flow valves will be utilized to control both the drive motor 56 and the cylinder 76. By adjusting the work gripping jaws 14 and 16 angularly the saw will cut a transverse angle across the work; and by adjusting the arms 24 by means of the sector locks 30–32 the end cut may be bevelled or square. By adjustment of the limit switches and the arms 24, notches may be cut at varying angles and depths into the work.

Co-acting with the angular adjustments of the saw blade is a novel quick adjustment and release of the adjustable work gripping jaw 16 and the hand wheel control 18. As is best illustrated in FIGS. 4 and 5, the hand wheel 18 operates a clamp screw 82 which extends transversely under the bottom of the work bed 12 and the work gripping jaw 16. A guide rib or bar 84 on the under side of the base of the gripper 16 travels in a transverse slot 86 in the work bed 12. The gripper jaw pivots horizontally about an upright pivot pin 88 projecting upwardly from the bar 84, as by screws 90, and projecting in lapped relation to the bottom of the bed on each side of the slot 86 is a retainer shoe 92. Pivotlly connected to the under side of the shoe 92, on each side of the clamp screw 82, as by the pivot screws 94, are a pair of opposed sector thread blocks 96. The blocks define sectors of teeth 98 which mesh with the thread on the screw 82 when the blocks are closed against the side of the screw. The swinging or left ends of the blocks 96 as illustrated have upwardly projecting abuttment pins 100 on their upper end, and downwardly projecting anchor pins 102 on their undersides. In the example illustrated a single pin on each block performs both functions. A coiled tension spring 104 stretched between both anchor pins biases the teeth into engagement with the thread on the screw 82.

A release knob 104 on the upper end of a short shaft 106 connects to a bar cam 108 located between the bottom of the bed plate 12 and the upper sides of the screw sector blocks 96, and between the upwardly projecting abuttment pins 100. Rotating the knob 104 and the bar cam 108 until the lobes 110 of the cam engage between the pins 100, as illustrated, separates the sector teeth 98 from the screw 82. This permits the gripping jaw 16 to be slid freely and quickly to any adjusted position along the slot 86. Once engaged with the thread of the screw the gripper block 16 is firmly locked relative to the screw.

Angular adjustment of the gripper jaw about the pin 88 is effected by the clamp screw 112 is engaged in the guide rib or bar 84 and sliding in an arcuate slot 104 in the base of the gripper block.

What is believed to be new and what is desired to be secured by Letters Patent is defined in the following claims:

1. In a sawing machine having a work supporting base, work holding jaws adjustable relative to each other along the surface of said base and angularly adjustable about parallel axes normal to said base, the combination comprising:
    a pair of arms swingable connected along a common axis to said base, one at each end of the base, and swingable in parallel planes normal to the work supporting surface of said base, said arm each having a slideway thereon extending longitudinally of each arm and in parallel relation,
    means connecting said arms to swing in unison,
    a pair of slide members, one slidable along each of said slideways,
    a pair of frame members connected one to each of said slide members and projecting in parallel relation laterally from said slideways and each having a wheel support element projecting longitudinally of the base and in a common plane inclined about 45 degrees from said slideways,
    a pair of saw pulley wheels mounted on said wheel support elements and rotatable in a plane parallel to the plane of the elements,
    a motor connected to drive one of said wheels and a band saw trained around the wheels,
    and power means anchored to one of said arms and swingable therewith, said power means being connected to the slide member on said one arm to move the slide member along the arm.

2. A sawing machine as defined in claim 1 in which there is a longitudinal tie member connecting the ends of said slide members remote from the common pivot of said arms.
    blade guide support arms slidably adjustably connected to said tie member and projecting therefrom toward the working reach of said saw blade,
    and blade guide and thrust rollers on the ends of said support arms engagable with said working reach.

3. A sawing machine as defined in claim 2 in which said guide and thrust rollers are arranged to twist the working reach of said band saw out of the plane of said pulley wheels.

4. A sawing machine as defined in claim 1 in which said power means for moving said slide members is an hydraulic cylinder anchored to said one arm and having a piston rod connected to the slide member.

5. A sawing machine as defined in claim 4 in which said motor for driving said saw is an hydraulic motor supplied from the same source as said cylinder.

6. A sawing machine as defined in claim 4 in which there are rack teeth carried along the edges of said arms, and a pinion shaft journaled in said slide members,
    and pinions non-rotatably connected to said shaft and meshing with said rack teeth.

7. A sawing machine as defined in claim 6 in which there is a sector lock means releasably lockable between one of said arms and the end of said base to selectively lock said arm member to said base.

8. In combination in a sawing machine having a flat work supporting base with opposed work clamping jaws adjustable thereon in variable angular and transversely spaced relations,
    a pair of arms, one at each end of said base, pivoted to the base along a common axis, each arm having a slideway therealong,
    means connecting said arms in parallel for simultaneous rotation about said common axis and through an arc of 45 degrees,
    lock means for selectively securing said arms in angularly adjusted positions,
    a saw support frame having pulley wheels rotatably mounted in co-planar relation, one at each end of said support frame,
    means forming slides on the ends of said support frame and disposed in a plane at an angle to the plane of said pulley wheels, said slides being movable along said slideways,
    a motor carried by said support frame and connected to drive one of said pulleys,
    a band saw trained around said pulleys,
    and blade guide support arms slidably adjustably mounted for movement longitudinally along a side of said support frame and having guide and thrust rollers on their ends engaged with the working reach of said band saw.

9. The combination as defined in claim 8 in which there is an hydraulic cylinder having a coacting piston and piston rod arranged to swing with said first pair of arms with the cylinder and the extensible end of the rod anchored between said arms and said support frame to move said support frame along said slideways.

10. The combination as defined in claim 9 in which there are rack teeth arranged along each of said slideways,
and pinions rotatably mounted on said first arms and meshing with said rack teeth with a shaft connecting the pinions for simultaneous rotation.

11. The combination as defined in claim 9 in which said hydraulic cylinder is anchored to one of said first pair of arms and said piston rod is anchored to said support frame,
said motor for driving said saw blade being an hydraulic motor,
and both said cylinder and said motor being supplied from a common source.

12. The combination as defined in claim 8 in which said guide rollers twist the working reach of said saw blade into a plane parallel to said slides.

13. The combination as defined in claim 8 in which one of said work clamping jaw is adjustable transversely of said base by means of a hand operated clamp screw journalled in said base,
a quick release between said screw and said one jaw comprising:

a guide bar secured to the bottom of said one jaw and projecting therebeyond,
a release shaft extending vertically through the projecting portion of said guide bar and having a hand control element on top and a cam on its lower end between said bar and said screw,
a pair of opposed thread engaging blocks laterally swingably connected to the bottom of said guide bar by pivot pins projecting downwardly from the guide bar and on opposite sides of said screw and said cam,
said blocks having opposed thread engaging sectors formed on their sides in spaced relation to said pivot means,
pin means projecting from the tops of said blocks and in the path of said cam to spread said thread engaging sectors,
anchors projecting from the bottoms of said blocks, and spring means engaged between said anchors and biasing said sectors into engagement with said screw.

14. The combination as defined in claim 13 in which said spring means is a tension coil spring having its ends connected to said anchors,
and said anchors are srews engaged in the bottoms of said blocks in the general area of said pin means.

* * * * *